(12) United States Patent
Lehr et al.

(10) Patent No.: US 8,961,909 B2
(45) Date of Patent: Feb. 24, 2015

(54) SHELL-AND-TUBE REACTOR FOR CARRYING OUT CATALYTIC GAS PHASE REACTIONS

(75) Inventors: Manfred Lehr, Deggendorf (DE); Josef Dachs, Deggendorf (DE); Franz Egner, Rinchnach (DE); Rolf Bank, Deggendorf (DE); Bernd Stürmer, Stuttgart (DE); Volkmar Frick, Stuttgart (DE); Michael Specht, Waldenbuch (DE)

(73) Assignee: MAN Diesel & Turbo SE, Augsburg (DE)

( * ) Notice: Subject to any disclaimer, the term of this patent is extended or adjusted under 35 U.S.C. 154(b) by 44 days.

(21) Appl. No.: 13/823,525

(22) PCT Filed: Oct. 12, 2011

(86) PCT No.: PCT/EP2011/067761
§ 371 (c)(1),
(2), (4) Date: Apr. 9, 2013

(87) PCT Pub. No.: WO2012/035173
PCT Pub. Date: Mar. 22, 2012

(65) Prior Publication Data
US 2013/0287652 A1  Oct. 31, 2013

(30) Foreign Application Priority Data
Sep. 14, 2010 (DE) .......................... 10 2010 040 757

(51) Int. Cl.
*B01J 8/06* (2006.01)
*C10G 2/00* (2006.01)
(Continued)

(52) U.S. Cl.
CPC *B01J 8/067* (2013.01); *B01J 8/065* (2013.01); *C10G 2/32* (2013.01); *C10G 2/341* (2013.01); *C10L 3/08* (2013.01);
(Continued)

(58) Field of Classification Search
CPC ................ B01J 2208/00238; B01J 2208/0023
USPC .......................................... 422/651, 652, 659
See application file for complete search history.

(56) References Cited

U.S. PATENT DOCUMENTS 3,268,299 A * 8/1966 Russell .......................... 422/111
3,922,148 A   11/1975 Child
3,970,435 A   7/1976 Schultz et al.
(Continued)

FOREIGN PATENT DOCUMENTS

DE  25 21 189   11/1975
DE  24 36 297   1/1976
(Continued)

*Primary Examiner* — Lessanework Seifu
(74) *Attorney, Agent, or Firm* — Cozen O'Connor

(57) ABSTRACT

A tube bundle reactor for carrying out catalytic gas phase reactions, particularly methanation reactions, has a bundle of catalyst-filled reaction tubes through which reaction gas flows and around which heat carrier flows during operation. In the region of the catalyst filling, the reaction tubes run through at least two heat carrier zones which are separated from one another, the first of which heat carrier zones extends over the starting region of the catalyst filling. The reaction tubes each have a first reaction tube portion with a first hydraulic diameter of the catalyst filling and, downstream thereof in flow direction of the reaction gas, at least a second reaction tube portion with a second hydraulic diameter of the catalyst filling that is greater than the first hydraulic diameter of the catalyst filling.

7 Claims, 2 Drawing Sheets

(51) Int. Cl.
*C10L 3/08* (2006.01)
*F28F 13/08* (2006.01)

(52) U.S. Cl.
CPC ............... *B01J 2208/0023* (2013.01); *B01J 2208/00238* (2013.01); *B01J 2208/0053* (2013.01); *F28F 13/08* (2013.01)
USPC ..................... 422/659; 422/651; 422/652

(56) References Cited

U.S. PATENT DOCUMENTS

| | | | |
|---|---|---|---|
| 4,130,575 | A | 12/1978 | Jorn |
| 4,205,961 | A | 6/1980 | Möller et al. |
| 7,445,758 | B2 * | 11/2008 | Adris et al. ................. 422/239 |
| 2006/0003402 | A1 | 1/2006 | Adris et al. |
| 2009/0163748 | A1 * | 6/2009 | Bank et al. ................. 585/250 |
| 2010/0162626 | A1 | 7/2010 | Clomburg, Jr. et al. |

FOREIGN PATENT DOCUMENTS

| | | |
|---|---|---|
| DE | 25 49 439 | 5/1976 |
| DE | 27 29 921 | 1/1979 |
| DE | 29 49 588 | 6/1980 |
| DE | 29 29 300 | 1/1981 |
| DE | 000002436297 C2 | 12/1982 |
| DE | 32 47 821 | 9/1984 |
| DE | 10 2004 040 472 | 3/2006 |
| EP | 1 033 167 | 9/2000 |
| EP | 1 627 678 | 2/2006 |
| EP | 2 110 425 | 10/2009 |
| JP | 61 054 229 | 3/1986 |
| WO | WO 03/011449 | 2/2003 |

* cited by examiner

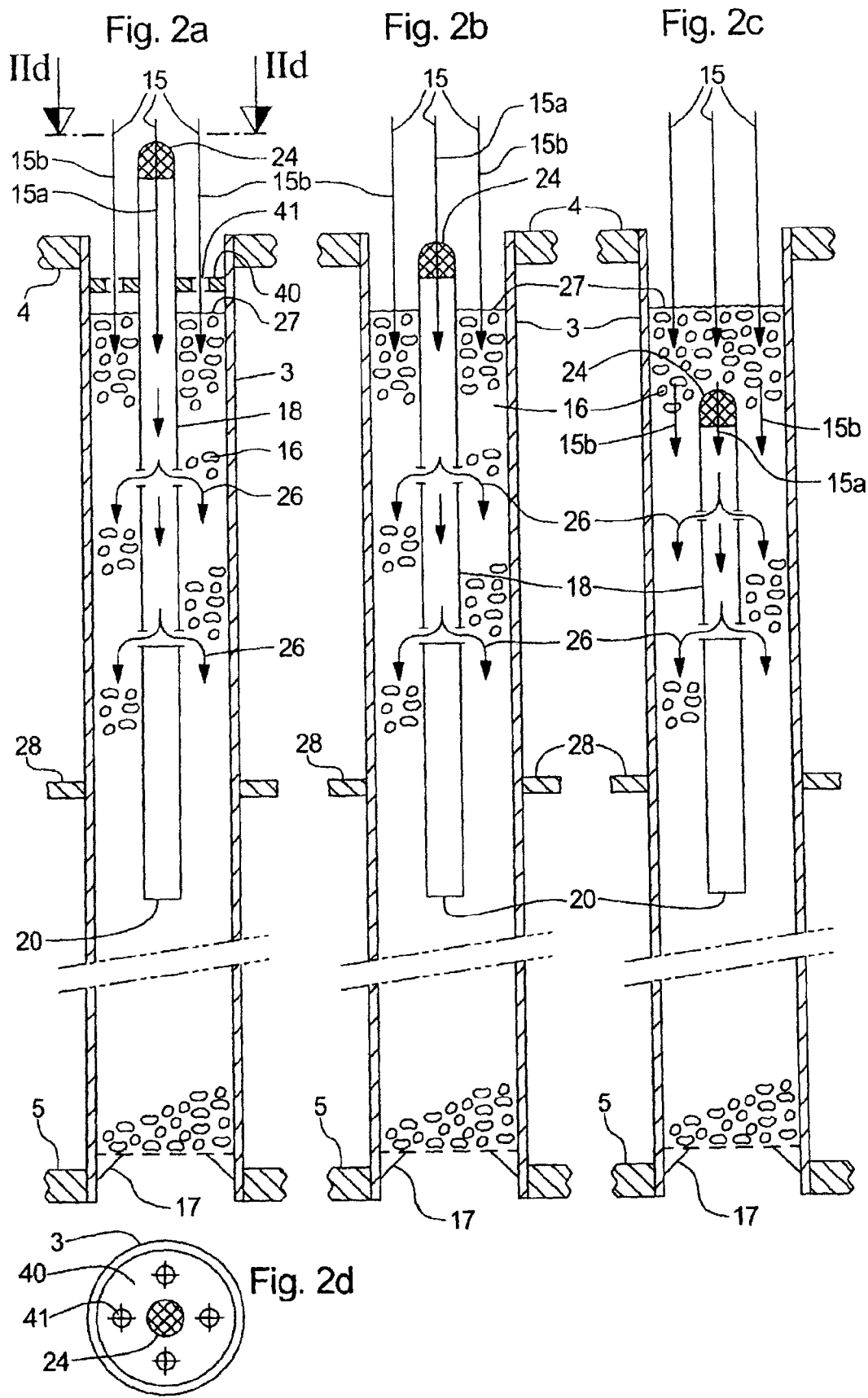

SHELL-AND-TUBE REACTOR FOR CARRYING OUT CATALYTIC GAS PHASE REACTIONS

PRIORITY CLAIM

This is a U.S. national stage of PCT International Application No. PCT/EP2011/067761, filed on 12 Oct. 2011, which claims priority to German Application No. 10 2010 040 757.7, filed 14 Sep. 2010, the contents of which are incorporated herein by reference in their entirety.

BACKGROUND OF THE INVENTION

1. Field of the Invention

The invention is directed to a tube bundle reactor for carrying out catalytic gas phase reactions, particularly methanation reactions, having a bundle of catalyst-filled reaction tubes through which reaction gas flows and around which heat carrier flows during operation, wherein, in the region of the catalyst filling, the reaction tubes run through at least two heat carrier zones which are separated from one another, the first of which heat carrier zones extends over the starting region of the catalyst filling, and wherein during operation the heat carrier temperatures for each heat carrier zone can be adjusted in such a way that they decrease from zone to zone in flow direction of the reaction gas.

By "starting region of the catalyst filling" is meant within the framework of the present application the region in the catalyst filling in which a region of maximum reaction temperature, or hot spot, develops shortly after the entrance of the reaction gas.

2. Description of the Related Art

In the face of finite natural gas deposits, there is a growing interest in the production of a natural gas substitute. This gas, known as SNG—substitute natural gas or synthetic natural gas—is produced from coal, particularly lignite coal, or biomass (bio-SNG or biomethane) by way of synthesis gas. In order for SNG to substitute for natural gas, the composition and properties of the SNG must correspond as far as possible to those of natural gas. For injection of SNG into the natural gas grid, for example, the "DVGW G260/G262 Specification on Substitute Gas", referred to hereinafter as "injection specification", states that the $CO_2$ content may be no more than 6 vol % and the $H_2$ content no more than 5 vol %.

Irrespective of feedstock, SNG production is carried out in four process steps. First, the carbon-containing feedstock is broken down by addition of heat, water and possibly oxygen to form a synthesis gas which is chiefly composed of carbon monoxide, carbon dioxide, hydrogen and water. Injection of air is avoided on principle because the main constituent thereof, nitrogen, limits the methane concentration and undesirable side reactions can take place at higher temperatures. Synthesis gas production is carried out either in an autothermal reactor in which the heat is generated through partial oxidation by the reaction gas itself or in an allothermal reactor in which heat is supplied externally. The latter method has the advantage that additional flue gas is not introduced into the process gas. In a second step, the synthesis gas is cleaned and cooled. The actual methanation is carried out in a third step. In a fourth step, undesirable gas constituents are removed from the synthesis gas and its composition is adapted to the desired application.

The essential methanation reaction is strongly exothermic. It is catalyzed with elements of main group VIII, preferably nickel. In so doing, 3 moles of hydrogen react with one mole of carbon monoxide and 4 moles of hydrogen react with one mole of carbon dioxide to form methane and water:

$$CO+3H_2 \leftrightarrow CH_4+H_2O \quad \Delta H_R^O=-206 \text{ kJ/mole}$$

$$CO_2+4H_2 \leftrightarrow CH_4+2H_2O \quad \Delta H_R^O=-165 \text{ kJ/mole}.$$

Since the large proportion of hydrogen for a complete conversion is usually not present in the original synthesis gas, it is often increased by converting carbon monoxide and water to hydrogen and carbon dioxide using the so-called water gas shift reaction according to the following equation:

$$CO+H_2O \leftrightarrow H_2+CO_2 \quad \Delta H_R^O=-41 \text{ kJ/mole}$$

A multitude of other side reactions also take place in addition, including the Boudouard reaction in which carbon monoxide decomposes to carbon and carbon dioxide:

$$2CO \leftrightarrow C+CO_2 \quad \Delta H_R^O=-173 \text{ kJ/mole}$$

This reaction is undesirable because the carbon monoxide needed for methanation is removed and the carbon settles on the surface of the catalyst and deactivates it. This reaction can be suppressed through addition of water.

The article "Development of a method for methanation of biomass-based synthesis gas in honeycomb catalysts, GWF, 150 (2009) Nos. 1-2, pp 45-51, discusses the equilibrium conversion of the methanation reaction under stoichiometric conditions. According to this article, methane formation is promoted at high pressures and low temperatures. In pressureless operation, CO conversions of up to 95% are possible in a temperature range between 200° C. and 350° C. At higher temperatures, the pressure must always be further increased to obtain identical conversions. Here also, the reaction rate climbs as the temperature increases. In pressureless operation, a residence time of 1 s is required for a virtually complete conversion at a temperature of approximately 225° C., and a residence time of 0.01 s at about 325° C. Thus the reaction conditions have a decisive influence on the reactor size and reactor concept.

The article "SNG from coal and dry biomass—A technology review from 1950 to 2009", Fuel, Volume 89, Issue 8, August 2010, pp 1763-1783, gives a broad overview of the methods developed for the production of SNG.

A large number of methods were developed at the time of the oil crisis in the 1970s with the focus on producing SNG from readily available coal. Methods using fixed bed reactors are known as the Lurgi, TREMP (Haldor Topsoe), Conoco/BGC, HICOM, Linde, RMP and ICI/Koppers processes. Fluidized bed methods were developed by the Bureau of Mines, in the Bi-Gas Project and in the Comflux process. Other concepts include the Synthane Project, catalytic coal gasification and liquid phase methanation.

The reactors employed work either adiabatically with intermediate coolers or are preferably cooled by boiling water. Often, a partial flow of the product gas is cooled intermediately and returned to the reactor input.

So far, the world's only industrial plant for methane production from coal is the Great Plains Synfuels Plant in North Dakota, USA, which has been in operation since 1984. Further plants were not built due to the high investment costs and discovery of new natural gas sources. In the North Dakota plant, synthesis gas is generated in 14 parallel gasifiers and is methanated in a number of autothermal methanation reactors with intermediate cooling stages. The carbon dioxide occurring in so doing is stored underground.

German Published Application No. 25 49 439 describes a method for producing SNG in which a preheated synthesis gas containing carbon oxides and hydrogen is conducted through an adiabatic fixed bed reactor and a portion of the product gas is recycled and mixed with the raw gas. Returning the hydrogen-containing product gas renders a shift reaction superfluous. On the other hand, the size of the reactor is increased slightly. The inlet temperature is between 250° C. and 350° C., the outlet temperature is between 500° C. and 700° C. The product gas is cooled so that it has a temperature between 250° C. and 350° C. and is at least 50 degrees above the dew point. A portion of the product gas is extracted as cycle gas and is returned to the raw gas flow.

A method for generating a gas with a methane content of from 90 to more than 98 mole % is described in U.S. Pat. No. 3,922,148 and in the corresponding German Published Application No. 25 21 189 A1. Here, high boiling fractions of the petroleum preparation are first converted with pure oxygen and steam to synthesis gas with a methane content of 6 to 20 mole %, dry, at temperatures between 650 and 930° C. and a pressure between 25 and 150 bar. After cooling and cleaning, the methane content of the gas is increased stepwise in three fixed bed methanation reactors to the final concentration. The gas is cleaned and cooled between stages in each instance. The process is very cumbersome due to the large number of methanation steps. Further, a portion of the feedstock must be burned in generating the synthesis gas. Large amounts of working steam are generated. On the whole, the efficiency of the process is poor.

U.S. Pat. No. 3,970,435 describes a methanation reactor with synthesis gas supplied from coal gasification. The synthesis gas coming from the gasifier has a composition of 35% $H_2$, 35% CO, 2% $CO_2$, 2% CO, 2% $H_2O$, 25% $CH_4$ and 1% impurities, e.g., $H_2S$, flyash or tar. The pressure is approximately 69 bar. The hydrogen content is increased in a shift reactor. After a $CO_2$ gas scrubbing, the gas contains 56.2% $H_2$, 18.8% CO and 25% $CH_4$. The temperature at the inlet into the first reactor is 260° C. It comprises a boiling-water tube bundle reactor with catalyst-coated star-shaped inserts in the reactor tubes. The catalyst inserts separate the reaction tube cross-sectionally into a plurality of independent flow channels. This construction results in low pressure losses. The activity of the catalyst varies along the tube axis and is adjusted in such a way that preferably the same amount of heat is generated along the entire length of the tube. The lifetime of the catalyst is increased in this way. The reaction tubes are assembled in rows which are immersed in boiling medium, preferably water, in a plurality of receptacles. Return lines are additionally provided inside each receptacle. The pressure in the heat carrier space is limited to approximately 69 bar corresponding to a boiling temperature of water of 285° C.

European Published Patent Application No. 2 2110 425 proposes a similar multiple-stage process with the important difference that the methanation reactors which are connected in series operate adiabatically and each have a downstream product cooler. The feedstock for synthesis gas generation is either coal or biomass. The prior art proceeds from a multiple-stage process in which large amounts of product gas are fed back to the respective individual reactors as cycle gas to thin the inlet gas entering the reactor. According to European Published Patent Application No. 2 110 425 A1, the amounts of cycle gas are reduced in that the synthesis gas is not returned in its entirety to the first reactor but is rather distributed parallely to the individual reactors. Cycle gas is used only in the first reactor. Prior art methanation reactors are used. The levels of catalyst activity in the individual reactors is not discussed. The operating pressure is 35 bar, the inlet temperature is between 240° C. and 300° C., the outlet temperature is about 600° C.

German Published Patent Application No. 24 36 297 describes a process for producing a SNG which can be injected directly into the natural gas grid. The raw gas that is used is produced through gasification under pressure of coal, tars or heavy residual oils with the addition of steam and oxygen at 1100° C. to 1500° C. under pressures between 20 and 80 bar. After cooling and cleaning, particularly of sulfur compounds, it is subjected to methanation in at least two stages over nickel catalysts under pressures from 5 to 100 bar and temperatures between 200 and 500° C. After the first methanation stage, the product gas has a methane content of at least 60 vol % and is converted in the last methanation stage over a catalyst that is cooled indirectly with gas countercurrently.

German Published Patent Application No. 27 29 921 A1 presents a process for generating a SNG with at least 80 vol % methane which is carried out by multiple-stage methanation in fixed beds with nickel catalysts under pressures of 5 to 100 bar. In so doing, a synthesis gas is first produced, cleaned and cooled according to a known method for coal gasification under pressure. With a methane content of 8 to 25%, it is first converted in a high-temperature methanation with inlet temperatures of between 230° C. and 400° C. and outlet temperatures between 550° C. and 750° C. and subsequently guided in a low-temperature methanation at temperatures from 230 to 500° C. The high-temperature methanation is carried out in at least two adiabatic fixed bed reactors. In so doing, a portion of the product gas exiting from the fixed bed reactors is removed, cooled, condensed and fed back to the respective reactor inlet. The methane-containing product gas exiting from the final high-temperature fixed bed reactor is cooled before entering the low-temperature methanation. The low-temperature methanation is carried out in an adiabatic fixed bed reactor and a cooled countercurrent flow reactor, e.g., according to German Published Patent Application No. 24 36 297.

In German Published Patent Application No. 29 49 588, a methane-rich gas is produced at elevated pressure and elevated temperature in such a way that the supplied synthesis gas is divided into two partial flows. The first partial flow is guided through a catalytic adiabatic fixed bed and is subsequently cooled to 250° C. to 400° C., and superheated steam is generated by which steam turbines can be driven for generating power. It is subsequently mixed with the second partial flow and guided into a second methanation reactor which, however, is cooled. A shift reactor is arranged immediately in front of the first adiabatic fixed bed reactor.

United States Published Patent Application No. 2010/0162626 claims an adiabatic methanation reactor with two reaction zones which are filled with catalyst and separated from one another by a separating wall. The reaction gas mixture is divided into preferably two equal partial flows and fed to the reactor on opposite sides so that the two partial flows are guided through the reactor countercurrently. In this way, the reaction gas is cooled at the end of a reaction zone by the reaction gas entering on the other respective side of the separating wall. The reactor is preferably constructed as a tube bundle reactor. In a known manner, the first portion of the respective catalyst charge is used for the shift reaction and the second portion is used for the actual methanation. This first reactor is followed by further strictly methanating reactors which are constructed in the same way as the first methanation reactor. There are cooling stages between the individual reactors.

In German Published Patent Application No. 32 47 821, a reaction tube filled with catalyst is used for a methanation reaction, its first section having a reduced hydraulic diameter. The entire reaction tube is preferably cooled by boiling water.

International Published Patent Application No. 03/011449 discloses a tube bundle reactor with reaction tubes whose hydraulic diameter increases conically in uniform steps or continuously in the flow direction of the reaction gas. The heat carrier flows counter to the flow direction of the reaction gas from the larger end of the reaction tube to the smaller end of the reaction tube. Further, it is suggested to arrange the reaction tubes next to one another in groups and to enlarge the hydraulic diameter from group to group or to form all reaction tubes identically but increase the quantity thereof from group to group. In so doing, one and the same heat carrier stream flows through all of the reaction tube groups, or each reaction tube group has its own heat carrier circulation as in the adjacently arranged individual tube bundle reactors.

European Published Patent Application No. 1 627 678 A1 suggests a method for carrying out catalytic gas phase reactions using a tube bundle reactor in which the reaction gas mixture is divided up at the inlet into the reaction tubes and is metered to different locations along the catalyst filling via center pipes located in the reaction tubes.

In order to achieve long-term independence from fossil fuels and to reduce carbon dioxide emissions, biomass is increasingly used for providing liquid and gaseous fuels as well as power and heat.

The generation of methane and heat by fermentative processes is a simple and widespread method. However, the generated methane has only a limited concentration and is mostly used only for generating power. It must be further conditioned for use as SNG.

The article "Generating SNG from lignin-rich biomass", Energie/Wasser-Praxis April 2009, pp 10-16, presents the known modes for utilizing energy from biomass. It is shown that the conversion of biomass to SNG via the intermediate steps of gasification and methanation achieves the highest energy conversion level. Further, in other methods energy in the form of heat and electricity either cannot be stored or can be stored only to a limited extent for flexible commercial use.

Currently available commercial industrial methanation plants and processes were developed for coal gasification. In a majority of these processes, the methanation is carried out at elevated pressure usually between 20 bar and 80 bar and at temperatures between 350 and 500° C. The selected methanation temperatures are deliberately high in order to generate high-pressure steam with the corresponding reaction heat for conjoint generation of electricity. Methanation reactors of this type are challenging from a design perspective and are cost-intensive.

Coal is won in particular regions where large coal deposits are found. In these regions, there is a centralized availability of abundant quantities of coal. Therefore, concepts based on large throughputs and the generation of electrical power by means of high-pressure steam can be carried out economically using coal gasification. However, biomass is not accessible in a centralized manner and, further, has an appreciably lower energy density compared to coal. This leads to plant sizes that are smaller by at least an order of magnitude than those known from coal gasification. Optimal plant sizes for thermochemical conversion of biomass have a fuel performance between 20 MW and 100 MW. Accordingly, the concepts for coal gasification cannot be economically transferred to appreciably smaller biomass gasification plants, which is also why there are no industrial bio-SNG plants at the present time.

Important research work on this topic is currently being carried out, e.g., by the ECN (Energy Research Center of the Netherlands). Studies are being conducted in SNG production through wood gasification and methanation in a fixed bed reactor.

A semicommercial 1 MW SNG plant has been in operation in Güssing, Austria, since 2002. There, it was possible to show an improved generation of SNG from biomass with the AER process in which the biomass is gasified with a two-bed gasifier. In so doing, a circulating solid reactive $CO_2$ adsorbent is used at a low gasification temperature. The Paul Scherrer Institute (PSI) has built a fluidized bed reactor for methanation. In 2009, the plant as a whole produced 100 $m^3$/h SNG of natural gas quality for 250 hours. The plant continues to produce useful heat and electricity. A more detailed description of this and other subjects can be found at www.eee-info.net/cms.

In collaboration with the present applicant, the ZSW is researching a novel methanation process using a salt bath-cooled fixed bed reactor, see Press Release June 2009, www.zsw.de or "Production", Nos. 24-25, p 15. A corresponding reactor concept was presented at ACHEMA 2009. Two modes for providing synthesis gas as feedstock for methanation were presented. On the one hand, the synthesis gas can be provided from biomass by the AER method. The advantages of the AER method reside in the minimizing of process steps by dispensing with a downstream $CO_2$ separation and dispensing with a CO shift step. On the other hand, previously unused electrical power which is generated from regenerative sources or by conventional power plants at nighttime can be used for hydrogen generation through electrolysis, see Press Release June 2010, www.zsw.de. Stored waste gases from power plants with fossil fuels or waste gases from biogas plants are used as carbon dioxide source.

A reaction tube, the key part of the methanation reactor, was shown schematically with three independent heat carrier circuits with liquid salt. The temperature decreases in the flow direction of the reaction gas. Advantages of this method were the tested reactor type, the scalable design of the reactor, optimal temperature control through adjustable temperature gradients in the range between 550° C. and 250° C. and through high heat capacity of the liquid salt, and operation on the pipe side of up to 20 bar. A synthesis gas having the following composition was used as raw gas for previous tests: 66.5% $H_2$, 8.5% CO, 13.0% $CO_2$ and 12.0% $CH_4$ (%=vol %). A product gas was obtained with 5.9% $H_2$, 8.0% $CO_2$ and 86.1% $CH_4$ (%=vol %). The tests were carried out at temperatures between 550° C. and 250° C. at a pressure of 4 bar and a space velocity of 4,000 Nl/($l_{cat}$*h).

The reactor concept presented by the applicant at ACHEMA 2009 allows a more economical methanation of biomass than has been achieved up to this point with other reactor designs. Thus, in adiabatically operated fixed bed reactors with downstream cooling, the reaction is only insufficiently controlled. With fluidized bed reactors, there remains the problem of catalyst attrition and a reaction progress comparable to an ideally mixed continuous stirred-tank reactor without completion of the reaction. However, the production costs are still relatively high, and the exit product gas still does not meet the injection specification for injection into the natural gas grid directly after drying. Therefore, there is still a need for suitable methanation reactors for producing SNG from biomass.

SUMMARY OF THE INVENTION

Accordingly, it is an object of the invention to improve a generic tube bundle reactor in such a way that the methanation of CO-, $CO_2$- and $H_2$-containing gases is more economically feasible particularly in smaller, decentralized plants, and in particular the generated product gas can be injected directly into the natural gas grid after drying.

According to the present invention, this object is met in a tube bundle reactor of the type mentioned above in that the reaction tubes each have a first reaction tube portion with a first hydraulic diameter of the catalyst filling and, downstream thereof in flow direction of the reaction gas, at least a second reaction tube portion with a second hydraulic diameter of the catalyst filling that is greater than the first hydraulic diameter of the catalyst, in that further the first reaction tube portion extends along the starting region of the catalyst filling, and in that the first heat carrier zone extends at most until the end of the first reaction tube portion.

By "hydraulic diameter of the catalyst filling" is meant within the framework of the present application the hydraulic diameter of the cross section which is formed by the walls surrounding the space filled with catalyst.

Through the steps according to the present invention, a higher space-time velocity and, therefore, a greater yield and improved catalyst utilization can be achieved while simultaneously meeting the injection specification for the natural gas grid. Owing to the fact that the reaction tubes have in their starting region, i.e., the location where the reaction gas streams into the catalyst filling and where, shortly thereafter, the maximum reaction temperature is anticipated, a reaction tube portion with a smaller hydraulic diameter of the catalyst filling than in the rest of the reaction tube, and a separate heat carrier zone which does not extend beyond this reaction tube portion is also adapted for this reaction tube portion, a high reaction temperature and, consequently, a high reaction rate can be employed in this first heat carrier zone with a correspondingly adapted heat carrier temperature and heat carrier velocity. The relatively small hydraulic diameter of the catalyst filling means a reduced radial transport path for the reaction heat and, therefore, faster removal of the reaction heat, i.e., in combination with the associated separate heat carrier zone, the cooling effect is appreciably improved. The higher reaction rate in turn causes a higher space-time velocity and, therefore, a reduction in the required catalyst volume. Therefore, smaller or fewer reaction tubes can be used while maintaining the same reactor performance, or higher throughputs can be achieved with the same catalyst volume.

In the adjoining second heat carrier zone, the lengths of the first reaction tube portion, which possibly extends therein, and of the second reaction tube portion combined with the heat carrier temperature and heat carrier velocity can be adapted to one another such that a reaction temperature profile and reaction profile is achieved whereby the reaction gas achieves a level of methanation that meets the injection specification for the natural gas grid when the generated product gas is dried.

If necessary, the reaction profile in the first reaction tube portion and in the second reaction tube portion can be adapted to different requirements by suitably constituting the catalyst filling.

The first reaction tube portion preferably has a hydraulic diameter of the catalyst filling in the range of 10 mm to 22 mm. A particularly fast heat transfer is achieved in this way because there is only a short radial heat transfer distance. A faster heat transfer in turn allows a correspondingly high space-time velocity.

In an advantageous further development of the present invention, every reaction tube has a constant inner diameter over its entire length, and a displacer is arranged at least in the first reaction tube portion. These steps allow a simple design layout of the different hydraulic diameters of the catalyst filling because the geometric dimensions of the reaction tube, i.e., of the outer tube enclosing the displacer, remain the same over the entire length of the reaction tube. The displacer, i.e., the first reaction tube portion formed by it, can extend into the second heat carrier zone by a length of preferably 5% to 60%, particularly preferably 10% to 40%, of the length dimension of the second heat carrier zone.

The displacer is preferably constructed as a tube. This is a simple, economical and weight-saving construction for a displacer.

In an advantageous embodiment of the present invention, the displacer tube has at least one inflow opening and at least one outflow opening through which a portion of the reaction gas flows while bypassing the catalyst filling. Due to the fact that a portion of the reaction gas flows past the catalyst filling along part of its flow path, the region of maximum reaction temperature is enlarged and the maximum reaction temperature itself is accordingly reduced thus reducing local stressing of the catalyst.

The inflow opening is preferably located upstream of the starting surface of the catalyst filling. This appreciably reduces the burden on the catalyst already in its starting surface or inlet surface.

All of the outflow openings are preferably located in the first heat carrier zone. Accordingly, the reaction gas flows into the catalyst filling entirely within the first heat carrier zone so that the regions of increased reaction temperature obtained there are also located within the first heat carrier zone in which the appropriately high heat dissipation is ensured in any case.

In an advantageous further development of the present invention, the distance between the final outflow opening in flow direction of the reaction gas and the downstream end of the first heat carrier zone is at least 10% of the length dimension of the first heat carrier zone. By means of this step, an extensive methanation of the reaction gas is ensured already in the first heat carrier zone.

In an advantageous embodiment of the present invention, the tube bundle reactor has exactly two heat carrier zones. Due to the fact that the first reaction tube portion extends over the starting region of the catalyst filling and the first heat carrier zone extends at most to the end of this first reaction tube portion, a reaction temperature can be employed there at a magnitude such that the greater part of the reaction gas is already methanated and only a second heat carrier zone is sufficient to complete the methanation of the reaction gas until the injection specification for the natural gas grid is met. Accordingly, a tube bundle reactor according to the invention is constructed in the most economical way possible.

The first heat carrier zone preferably extends over 15% to 40% of the length of the reaction tube. In this way, the level of methanation that is already achieved in the first heat carrier zone at high throughput is so high that thereafter—particularly even when there is only one further heat carrier zone—it is ensured that the level of methanation is increased until the injection specification is met.

BRIEF DESCRIPTION OF THE DRAWINGS

FIGS. 2a-c show cross sections through reaction tubes, with adjoining tube bases and separating plates, of a second, third and fourth embodiment form of a tube bundle reactor according to the invention, wherein the reaction tubes are shown in a greatly enlarged manner in transverse direction thereof.

FIG. 2d shows a top view of the reaction tube according to FIG. 2a along line IId-IId.

DETAILED DESCRIPTION OF THE PREFERRED EMBODIMENTS

Figure 1:
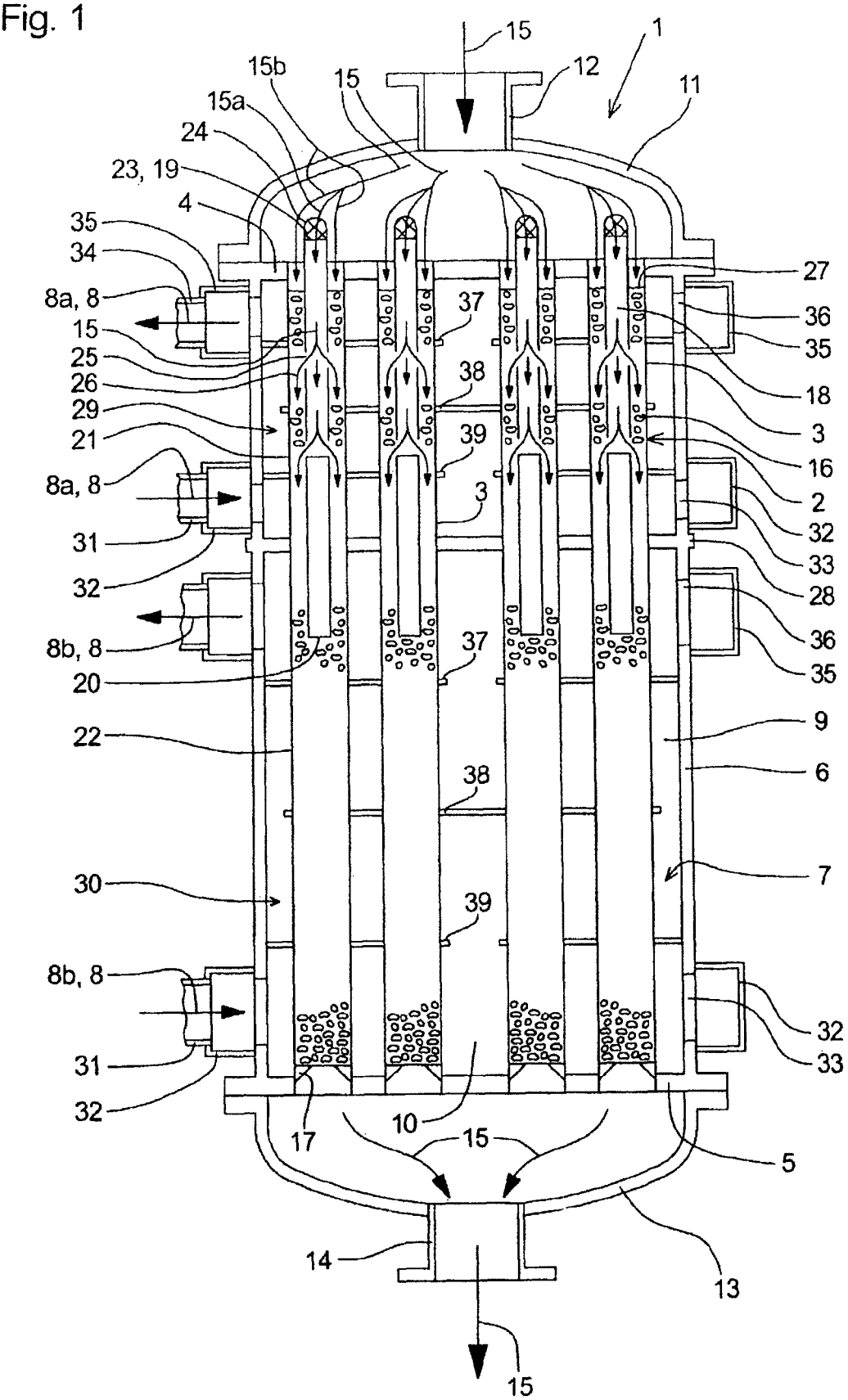
FIG. 1 shows a vertical section through a first embodiment form of a tube bundle reactor according to the invention, wherein the reaction tubes are shown in a greatly enlarged manner in transverse direction thereof.

The embodiment example of a tube bundle reactor 1 according to the present invention shown in FIG. 1 has a bundle 2 of catalyst-filled, vertical reaction tubes 3, both ends of which are open and are tightly fastened at the outer circumference thereof in an upper and a lower tube base 4, 5, respectively. The tube bundle 2 is enclosed by a reactor shell 6 which is tightly connected to the tube bases 4, 5 and, together therewith, forms a heat carrier space 7 in which a heat carrier 8, preferably liquid salt, flows around the reaction tubes 3.

The tube bundle 2 is constructed annularly with a tubeless outer ring 9 between the reactor shell 6 and the radially outer reaction tubes 3 and a tubeless interior space 10 between the radially inner reaction, tubes 3.

The upper tube base 4 is covered by a gas inlet head 11 having a gas inlet connection piece 12. The lower tube base 5 is covered by a gas outlet head 13 having a gas outlet connection piece 14.

The reaction gas 15 enters the tube bundle reactor 1 through the gas inlet connection piece 12, spreads in the gas inlet head 11 to the reaction tubes 3 and streams through the latter. The finished reaction gas 15, or product gas, exits the reaction tubes 3 into the gas outlet head 13 and then out of the tube bundle reactor 1 through the gas outlet connection piece 14.

The reaction tubes 3 have a constant cross section along their entire length. Their catalyst filling 16 lies on a catalyst holder 17 which is arranged at the lower end of the reaction tubes 3. The catalyst filling 16 extends from just above the lower tube base 5 to just below the upper tube base 4.

A displacer tube 18 is arranged in every reaction tube 3. The upper end 19 of the displacer tube 18 projects by a predetermined length out of the upper end, i.e., out of the gas inlet opening, of the reaction tube 3 into the gas inlet head 11, and the lower end 20 of the displacer tube 18 extends by a predetermined length into the catalyst filling 16.

Accordingly, the reaction tubes 3 each have a first reaction tube portion 21 in flow direction of the reaction gas 15 in which the displacer tube 18 is arranged and an adjoining second reaction tube portion 22 in which no displacer tube is arranged.

The interior of the displacer tube 18 has no catalyst material, and the hydraulic diameter of the catalyst filling 16 in the first reaction tube portion 21 is smaller than the hydraulic diameter of the catalyst filling 16 in the adjoining second reaction tube portion 22 in which a displacer tube is not arranged.

The end 19 of the displacer tube 18 extending into the gas inlet head 11 forms an inflow opening 23 for the reaction gas 15. The inflow opening 19, or inflow end, of the displacer tube 18 protrudes beyond the catalyst filling 16, reaction tube 3 and upper tube base 4 and is provided with a particulate filter 24. Inside the catalyst filling 16, the displacer tube 18 has outflow openings 25 at a total of two positions in the illustrated example. Portions 26 of the reaction gas 15 flowing in the displacer tube 18 exit from the outflow openings 25 into the catalyst filling 16.

Thus when entering the reaction tube 3, the full amount of reaction gas which flows through a reaction tube 3 does not also enter the starting surface 27 of the catalyst filling 16. Rather, a portion 15a of this amount of reaction gas initially streams into the displacer tube 18, where it bypasses the catalyst filling 16 before spreading along the catalyst filling 16, and streams out of the displacer tube 18 into the catalyst filling 16. This spatial distribution prevents the formation of a hot spot of excessively high reaction temperature.

The length of the displacer tube 18 extending into the catalyst filling 16 is so determined that it terminates downstream of the region of maximum reaction temperature (hot spot).

The heat carrier space 7 is divided into two separate heat carrier zones 29, 30 by a separating plate 28 extending transverse to the reaction tubes 3. The heat carrier zones 29, 30 are referred to as first heat carrier zone 29 and second heat carrier zone 30 with reference to the flow direction of the reaction gas 15. The separating plate 28 is arranged upstream of the lower end 20 of the displacer tube 18 and downstream of the region of the catalyst filling 16 in which the reaction temperatures reach their maximum, i.e., downstream of the region referred to within the framework of the present application as starting region of the catalyst filling 16. In the embodiment example shown in FIG. 1, the separating plate 28 is arranged at a distance of about 30% of the length of the reaction tube from the upper end of the reaction tubes 3, i.e., the length dimension of the first heat carrier zone 29 is approximately 30% of the length of the reaction tube starting from the upper end of the reaction tubes 3.

Each heat carrier zone 29, 30 has its own circulation of heat carrier 8 flowing through it. It enters in each instance through an inlet connection piece 31 into an inlet ring line 32 which encircles the reactor shell 6 and is fluidically connected to the respective heat carrier zone 29, 30 through inlet openings 33 in the reactor shell 6. The heat carrier 8 exits the heat carrier zone 29, 30 through an outlet ring line 35 which encircles the reactor shell 6 and which is fluidically connected to the heat carrier zone 29, 30 through outlet openings 36 in the reactor shell 6 and is discharged through an outlet connection piece 34.

In the illustrated embodiment, the inlet ring lines 32 are arranged respectively at the lower end of the heat carrier zone 29, 30, and the outlet ring lines 35 are arranged respectively at the upper end of the heat carrier zone 29, 30 so that the heat carrier 8 flows from bottom to top in each heat carrier zone 29, 30. Accordingly, the heat carrier 8 and reaction gas 15 flow through the tube bundle reactor 1 countercurrently.

Three horizontal baffles 37, 38, 39 are arranged in each heat carrier zone 29, 30 at a predefined vertical distance from one another and from the tube base 4, 5 and separating plate 28, respectively. The lowermost and uppermost baffle 39, 37 in every heat carrier zone 29, is constructed annularly. These annular baffles 39, 37 are tightly fastened to the inner wall of the reactor shell 6 and extend radially inward through the entire tube bundle 2 to the tubeless interior 10. The middle baffle 38 is disk-shaped and extends through the tubeless interior space 10 radially outward through the entire tube bundle 2 and terminates at a predefined distance from the inner wall of the reactor shell 6.

Accordingly, all of the reaction tubes 3 pass through all of the baffles 37, 38, 39 and are supported by the latter in transverse direction.

The inlet openings 33 for the heat carrier 8 are arranged between the lower annular baffle 39 and the lower tube base 5 in the second heat carrier zone 30 and, respectively, the separating plate 28 in the first heat carrier zone 29; the outlet openings 36 are arranged between the upper annular baffle 37 and the separating plate 28 and, respectively, the upper tube base 4 in the second and first heat carrier zone 30, 29, respectively. The heat carrier 8 is accordingly guided in a meandering manner by the baffles 37, 38, 39 in radial flow though the heat carrier zones 29, 30 so that the heat carrier 8 streams predominantly transversely against the reaction tubes 3.

In the first heat carrier zone 29, the reaction temperatures reach their maximum in the starting region of the catalyst filling 16. The first heat carrier zone 29 extends beyond this starting region by a predetermined extent. In the embodiment example according to FIG. 1, each of the two positions of the outflow openings 25 is arranged in the first heat carrier zone 29; however, the displacer tube 18 extends into the second heat carrier zone 30. The temperature and the flow velocity of the heat carrier 8a in this first heat carrier zone 29 are adjustable such that a reaction temperature which is as high as possible can be employed in this reaction tube portion 21 and, therefore, a space-time velocity which is as high as possible can be employed in the tube bundle reactor 1. The combination of a first reaction tube portion 21 having a smaller hydraulic diameter of the catalyst filling 16 and a first heat carrier zone 29 can accordingly be optimized exclusively to increase the space-time velocity.

In contrast, the temperature and velocity of the heat carrier 8b in the second heat carrier zone 30 combined with the length of the end of the first reaction tube portion 21 extending into the second heat carrier zone—if at all—and with the second reaction tube portion 22 can be optimized exclusively to increase the level of methanation of the reaction gas 15 until it meets the injection specification.

For example, the heat carrier temperature in the first heat carrier zone 29 is very high at 550° C. in order to bring about a reaction temperature which is as high as possible, and the heat carrier temperature in the second heat carrier zone 30 is very low at 250° C. in order to complete the methanation and to prevent unwanted side reactions.

As is shown by the following two methanation examples which were carried out with the tube bundle reactor 1 described above, the injection specification is easily met:
1. Synthesis Gas Methanation:
inlet mixture: 9% CO; 11% $CO_2$; 67% $H_2$; 13% $CH_4$ (%=vol %)
heat carrier: salt bath in both heat carrier zones
reaction gas pressure: p<20 bar
space-time velocity: 5,000 l/h
outlet mixture (dry): 92.3% $CH_4$; 4.3% $CO_2$; 3.4% $H_2$ (%=vol %).
2. Pure $CO_2$ Methanation:
inlet mixture: 20.6% $CO_2$; 79.4% $H_2$ (%=vol %)
heat carrier: salt bath in both heat carrier zones
reaction gas pressure: p<20 bar
space-time velocity: 5,000 l/h
outlet mixture (dry): 92.3% $CH_4$; 4.3% $CO_2$; 3.4% $H_2$ (%=vol %).

Three further embodiment for the arrangement of the displacer tube 18 in the reaction tube 3 are shown in FIGS. 2a to 2c.

The embodiment according to FIG. 2a corresponds to the embodiment example according to FIG. 1 with a throttle disk 40 which surrounds the displacer tube 18 and is tightly fastened to the latter and to the inner wall of the reaction tube 3. The throttle disk 40 has four through-holes 41 (FIG. 2d) through which reaction gas 15 can stream into the starting surface 27 of the catalyst filling 16.

The throttle disk 40 is arranged at a predefined distance above the starting surface 27 of the catalyst filling 16. The amount of reaction gas 15b to enter the starting surface 27 of the catalyst filling 16 can be adjusted by means of the throttle disk 40.

FIG. 2b shows an embodiment in which the displacer tube 18, including particulate filter 27, projects out of the catalyst filling 16 but does not extend beyond the upper tube base 4. The upper tube base 4 remains easily accessible in this embodiment form.

FIG. 2c shows an embodiment in which the displacer tube 18, including particulate filter 27, is completely embedded in the catalyst filling 16. This means that the entire amount of reaction gas flowing through the reaction tube 3 enters the starting surface 27 of the catalyst filling 16, and it is only in the catalyst filling 16 that a portion 15a of the amount of reaction gas enters the displacer tube 18.

In all of the embodiment according to FIGS. 2a-d to 2c, also, all of the outflow openings 25 are arranged in the first heat carrier zone 29, but the displacer tube 18, i.e., the first reaction tube portion 21, projects into the second heat carrier zone 30.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A tube bundle reactor for carrying out a catalytic gas phase reaction, comprising:
   a bundle of catalyst-filled reaction tubes through which a reaction gas flows and around which a heat carrier flows during operation; and
   at least two heat carrier zones separated from one another, wherein:
      in a region of a catalyst filling, the reaction tubes run through the at least two heat carrier zones,
      a first of the at least two heat carrier zones extends over a starting region of the catalyst filling,
      during operation heat carrier temperatures for the at least two heat carrier zones can be adjusted in such a way that the heat carrier temperatures decrease from zone to zone in a flow direction of the reaction gas,
      each of the reaction tubes has a first reaction tube portion with a first hydraulic diameter of the catalyst filling and, downstream thereof in the flow direction of the reaction gas, at least a second reaction tube portion with a second hydraulic diameter of the catalyst filling that is greater than the first hydraulic diameter of the catalyst filling,
      the first reaction tube portion extends along the starting region of the catalyst filling and into the second of the at least two heat carrier zones,
      every reaction tube has a constant inner diameter over its entire length and a displacer arranged at least in the first reaction tube portion, the displacer includes a tube, the displacer tube including at least one inflow opening and at least one outflow opening through which a portion of the reaction gas flows while bypassing the catalyst filling, and all of the outflow openings are located in the first heat carrier zone.

2. The tube bundle reactor according to claim 1, wherein the catalytic gas phase reaction includes a methanation reaction.

3. The tube bundle reactor according to claim 1, wherein the first hydraulic diameter of the catalyst filling of the first reaction tube portion is in a range of 10 mm to 22 mm.

4. The tube bundle reactor according to claim 1, wherein the at least one inflow opening is located upstream of a starting surface of the catalyst filling.

5. The tube bundle reactor according to claim 1, wherein a distance between a final one of the outflow openings in the flow direction of the reaction gas and a downstream end of the first heat carrier zone is at least 10% of a length of the first heat carrier zone.

6. The tube bundle reactor according to claim 1, wherein the tube bundle reactor includes exactly two heat carrier zones.

7. The tube bundle reactor according to claim 1, wherein the first heat carrier zone extends over 15% to 40% of a length of one of the reaction tubes.

* * * * *